United States Patent [19]

Grotz

[11] Patent Number: 4,510,123
[45] Date of Patent: Apr. 9, 1985

[54] TEMPERATURE CONTROLLED AMMONIA SYNTHESIS PROCESS

[75] Inventor: Bernard J. Grotz, Pasadena, Calif.

[73] Assignee: C F Braun & Co., Alhambra, Calif.

[21] Appl. No.: 444,720

[22] Filed: Nov. 26, 1982

[51] Int. Cl.³ ............................................. C01C 1/04
[52] U.S. Cl. .................................. 423/360; 423/361
[58] Field of Search ..................... 423/359, 360, 361

[56] References Cited

U.S. PATENT DOCUMENTS 3,851,046 11/1974 Wright et al. .................. 423/359
3,957,449 5/1976 Ciechowski .................... 423/360
4,230,680 10/1980 Becker et al. .................. 423/360

Primary Examiner—John Doll
Assistant Examiner—Wayne A. Langel
Attorney, Agent, or Firm—Lyon & Lyon

[57] ABSTRACT

A process for synthesizing ammonia with improved efficiency is disclosed. The increase in efficiency is achieved by regulation of the temperature of at least three catalyst beds connected in series by a combination of influent/affluent heat exchange and high pressure steam generation.

26 Claims, 2 Drawing Figures

TEMPERATURE CONTROLLED AMMONIA SYNTHESIS PROCESS

BACKGROUND OF THE INVENTION

The field of the invention is the synthesis of ammonia in a continuous process whereby a gas mixture containing an approximately stoichometric ratio of hydrogen and nitrogen is passed over a series of catalyst beds at relatively high pressure and controlled temperatures. Specifically, the invention herein relates to temperature regulation in this process by means of heat exchange effected between portions of the gas mixture itself at various stages of its progress through the process.

Ammonia production as commercially practiced utilizes the seemingly straightforward reaction between nitrogen and hydrogen in stoichometric amounts: $N_2 + 3H_2 \rightarrow 2NH_3$. The reaction is exothermic; accordingly, the equilibrium is shifted to the right by lower temperatures. However, as a practical matter, the temperature must be maintained at an elevated level in order to increase the reaction rate sufficiently to carry out the process in a reasonably short amount of time, even though catalysts are also used to accelerate the rate of the reaction. Thus, an appropriate balance between thermodynamic and kinetic considerations determine the appropriate temperature range at which the synthesis should be operated.

Thermodynamic considerations would also millitate that the reaction would be favored by higher pressure, since collisions between gas molecules are required to effect the synthesis. The pressure range at which this process is generally carried out is over 100 atmospheres, although it has been disclosed that synthesis procedures are possible with pressures of as low as 20 atmospheres (U.S. Pat. No. 3,957,449).

Temperature regulation is most often accomplished by a "quench" type ammonia conversion process. In this process, the synthesis gas containing nitrogen and hydrogen in roughly stoichometric amounts (syngas), preferably with as few diluents as possible, is passed through a catalytic bed of, for example, iron or promoted iron, to produce an effluent which is at a higher temperature than the original mixture due to the exothermic nature of the reaction. The effluent contains some percentage of ammonia, representing for example, 10 to 15% total volume. The temperature of the emerging gas is ordinarily sufficiently high to be thermodynamically inhibitory to further reaction. Therefore, before the effluent is passed through still another catalyst bed in order to increase the percentage conversion to ammonia, it is mixed with "cold" fresh synthetic gas thus lowering the temperature of the new mixture to the proper level. This process may be repeated for as many passes through catalyst beds as is desired. However, it suffers from the drawback that obviously not all of the syngas will pass through all of the catalyst beds.

U.S. Pat. No. 4,230,680 to Becker describes an alternative process whereby rather than mixing fresh syngas with partially converted effluent, only heat exchange between the fresh syngas and effluent is effected, not physical mixing of the gases. In the Becker process, a portion of effluent from each and every catalytic bed in the series is passed through a heat exchanger in which portion of the feed syngas provides a heat sink. U.S. Pat. No. 3,851,046 to Wright and Pickford discloses a two-bed process in which heat exchange is effected between effluent from the first bed and fresh syngas and the effluent from a single second bed is cooled by high-pressure steam generation. Both of the foregoing approaches turn out to be less efficient than that of the present invention wherein only the effluent from the first pass of syngas over catalyst is heat exchanged; and further cooling of subsequent effluents from multiple beds is accomplished by high pressure steam generation, which high pressure steam may then be employed for other purposes.

SUMMARY OF THE INVENTION

The invention herein relates to a process for synthesis of ammonia which establishes control of the temperature of the synthesis reaction through a combination of heat exchange between portions of the gas mixture flowing through the system, and high pressure steam generation by cooling effluents from a series of catalyst beds.

More specifically, the present invention relates to a process for synthesis of ammonia which employs a heat exchange between only the effluent of the first pass of syngas over a catalyst bed and at least a portion of the fresh syngas. Additional temperature control with respect to effluent of each of multiple succeeding catalytic beds is accomplished by including in the system, in series with each bed, a high pressure steam generator, which utilizes the heat of the effluent gas to generate steam of 1000 to 2000 psig, preferably 1500 psig.

DETAILED DESCRIPTION OF THE INVENTION

Definitions and General Parameters

As used herein, "syngas" or "synthesis gas" refers to a mixture of nitrogen and hydrogen in a ratio of 1:3 approximately, which may contain diluents such as argon and methane. While it is desirable to have zero diluent concentration, this is seldom achieved, and the syngas though composed substantially of hydrogen and nitrogen in stoichiometric ratio may be debilitated proportionally to the amount of contaminants therein. The process of the invention is affected by the presence of such diluents in essentially the same manner as alternate methods for carrying out the synthesis would be so affected.

"Final product effluent" represents the gas which has passed through the entire system and which is to be subjected to recovery processes to extract the ammonia therefrom.

Catalysts which are successful in accelerating the synthesis of ammonia are well known in the art. Prominent among these are finely divided iron, and promoted iron catalyst. While presumably the discovery of a superb catalyst which accelerates the reaction sufficiently that it would proceed at an acceptable rate at, for example, 400°–500° F. would alter the desired temperatures quoted hereinafter, the general principle on which the process of the invention rests would not be altered by the substitution of such improved catalysts, should they become known. However, of course, the preferred temperature ranges would be correspondingly lowered.

There are also a variety of designs for equipment which would contain the catalyst bed and through which the syngas flows in order to effect the conversion. The two major types of synthesis chambers which are now known are radial flow converters, and more commonly the OSW type ammonia converter in which the synthesis gas flow is downward or axial through the beds. The pattern of flow through the converter is not critical to the process of the invention.

Finally, no matter how many catalytic beds are employed, it is impracticable to obtain complete conversion of the synthesis gas to ammonia. Typically, the first catalytic pass results in a conversion of from 15 to 20% of the starting materials to ammonia, and succeeding passes result in further conversions. By application of the process of the present invention, after employing only three converters in series, the final product effluent should contain approximately 20% ammonia by volume which represents approximately 30-35% conversion of the starting material.

DETAILED DESCRIPTION OF A PREFERRED EMBODIMENT

Figure 1:
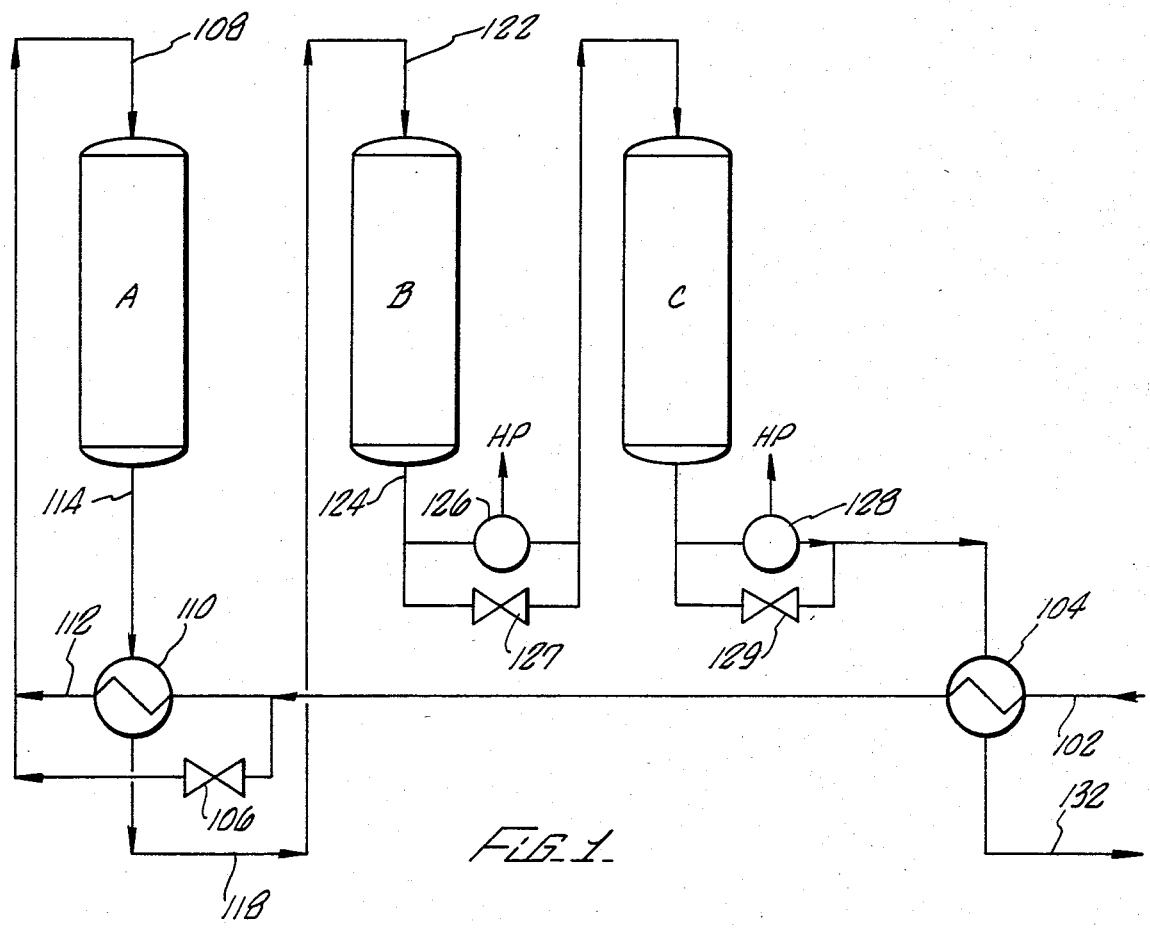
FIG. 1 is a schematic showing an embodiment of the invention wherein three catalytic beds are employed.

The preferred embodiment is best understood with reference to FIG. 1.

Syngas, as purified as is possible, enters the system at 102 and is passed through a heat exchanger 104 in which the heat source is at least a portion of the final product effluent.

The syngas which has thus been heated, preferably to a temperature of approximately 500° to 600° F. is then divided using the bypass control line with valve at 106, so that a portion of it passes directly finally to the first of the catalytic beds (A) at 108, and another portion passes through the heat exchanger 110 where it is used to cool the effluent from the first catalytic converter, and resulting in its temperature being further raised. The effluent from the heat exchanger 110 is then combined at 112 with the syngas from the bypass and the mixture is fed into the first converter in the series at 108. The temperature of the combined gases as they enter the first converter, labeled A in FIG. 1, is preferably between 700° to 800° F. In passing through converter A, a portion of the nitrogen and hydrogen are converted to ammonia in an exothermic reaction such that the exit temperature at 114 is between 900° and 1000° F. The effluent is cooled by providing the heat to the feed syngas in the aforesaid heat exchanger 110. Control over the final temperature before entry into catalyst bed B is maintained by the bypass line controlled by valve 106 which controls the amount of cooling gas. The gas entering the second catalytic bed B at 122 is preferably between 700° to 800° F. Further conversion to ammonia takes place in converter B with generation of sufficient heat to provide an effluent with an exit temperature at 124 of 850° to 950° F. This effluent gas is cooled by operation of a high pressure steam generator 126 to a temperature of 700° to 800° F., the proper temperature for the pass over the catalyst bed in converter C. Control over this process is maintained by a control valve in the bypass line at 127; the fraction of gas bypassing the steam generator being sufficient to retain the proper high temperature. Similarly, the reaction taking place in converter C results in an increase in temperature of the flowing gas mixture so that the temperature of the gas at the high pressure steam generator 128 is 800° to 900° F. As a result of the operation of the high pressure steam generator 128, the gas is cooled to 600° to 750° F.

Again, a bypass and control valve, 129, are provided. At least a portion of the gas emerging from the high pressure steam generator 128 is passed through the heat exchanger 104 to heat the original feed syngas to a temperature of about 500° to 600° F. The final product effluent is then subjected, by conventional means, to an ammonia recovery process.

By means of the operation of this process, a conversion of about 35% of the syngas to ammonia is achievable with three catalysis beds. By balancing the temperatures and control through heat exchange between the flowing gas at various stages of reaction, but using steam generation after multiple catalytic beds, subsequent to the first a comparatively high conversion is achieved.

The preferred embodiment described is provided with control mechanisms to regulate the temperature by controlling gas flow previous to the first heat exchanger (106) and in parallel with the high pressure steam generators (127 and 129). However, the invention is not limited to these locations for regulatory opportunities. For example, a bypass with control valve could be provided subsequent to the high pressure steam generator 128 so as to control the amount of warming gas entering the heat exchanger 104. Also, for example, a bypass could be provided after the effluent from tank A so that only a portion of the heated gas would enter the heat exchanger 110.

Figure 2:
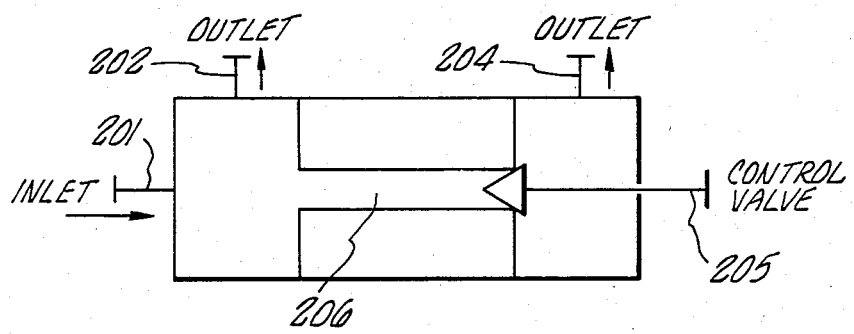
FIG. 2 shows a schematic of an internal bypass system.

In all of these cases, and as shown in FIG. 1, the bypass may be by means of a separate bypass line with control valve. However, it is generally preferable to incorporate, instead, an internal bypass valve, as shown schematically in FIG. 2, instead of a separate line. In operation, the incoming gas through inlet 201 exits through outlet 202 when the control valve 205 is closed so as to prevent flow of gas through passage 206. Varying proportions of the gas are allowed to exit at outlet 204 depending on the adjustment of the opening of this control valve. Bypass valves of this general instruction are well known in the art, and provide additional economy by eliminating the need for an extra line.

The following example is intended to illustrate the invention. It is not to be construed as limiting the scope.

EXAMPLE 1

Referencing FIG. 1, through line 102 is introduced at 188 bar pressure and 127° F. a feed gas stream containing 18,069 kg moles of hydrogen and 5,940 kg moles of nitrogen per hour. (The mixture contains, in addition, 840 kg moles of ammonia, 832 kg moles of argon and 211 kg moles of helium per hour; the helium and argon flows will remain substantially constant). After passing through the heat exchanger 104, the temperature of the mixture is 541° F.; after passing through heat exchanger 110, and being recombined with the portion circulating through the bypass valve 106, the temperature of the gas is 752° F. The mixture is then passed over catalyst bed A for partial conversion to ammonia. The catalyst is a 15 m³ cylindrical bed of 2.48 m 1D and 3.1 m in length (iron oxide). The exit gas from A is at 964° F. and contains 2,549 kg moles of ammonia, per hour 15,505 kg moles of hydrogen and 5,085 moles of nitrogen, representing a total of approximately 20% conversion. The exit gas is then passed through heat exchanger 110 to attain a temperature of 752° F., whereupon it enters catalyst bed B. The catalyst bed in B is 46 m³ and is also cylindrical of 3.0 m 1D and 6.6 m in length. After further conversion to ammonia, the exit gas from the catalyst B is at 901° F., and contains 3,740 moles ammonia, 13,720 moles hydrogen and 4,490 moles nitrogen, representing a total conversion of 29%. The effluent from the high pressure steam generator when combined with the gas which has circulated through the bypass valve system at 129 is at 752° F. as it enters the third catalyst bed in the series, C. The catalyst bed at C is 77 m³ and has a 3.2 m Id and is 9.6 m long. After the pass over catalyst bed C, the effluent contains 4510 kg moles ammonia per hour, 12,564 kg moles hydrogen and 4105 kg moles nitrogen, representing 35% total conversion. The temperature of existing mixture, which is 849° F. is then lowered to 619° F. by generation of steam before further cooling in the heat exchanger 104. The final product effluent exiting at 132 then represents approximately 31% conversion to ammonia (based on nitrogen fed to the system), and has an exit temperature of 181° F.

What I claim is:

1. A process for the synthesis of ammonia carried out at a pressure greater than 100 atmospheres which process comprises passing a mixture of gases in continuous flow through apparatus so as to carry out the following steps:
   (a) passing at least a portion of an ammonia feed syngas through a heat exchanger to increase its temperature;
   (b) passing said feed syngas from (a) through a first ammonia synthesis catalyst bed to obtain an effluent;
   (c) passing at least a portion of the effluent from (b) through the heat exchanger of (a) to decrease the temperature of said effluent;
   (d) passing the effluent from (c) through a series of at least two additional ammonia synthesis catalyst beds and then subsequent to each bed through a high pressure steam generator to decrease the temperature of the effluent and to obtain a final product effluent; and
   (e) recovering ammonia from the final product effluent of the series in (d).

2. The process of claim 1 wherein the process of (d) comprises two additional ammonia synthesis catalyst beds, in series each followed by a high pressure steam generator.

3. The method of claim 1 which includes heat exchange between at least a portion of the final product effluent in (d) and at least a portion of the feed syngas.

4. The process of claim 1, 2 or 3 wherein the feed syngas in (b) has a temperature of about 700° to 800° F.

5. The process of claim 1, 2 or 3 wherein the effluent from step (b) has a temperature of about 900° to 1000° F.

6. The process of claim 1, 2 or 3 wherein the cooled effluent from (c) has a temperature of about 700° to 800° F.

7. The process of claim 1, 2 or 3 wherein the temperature of the gas mixture at the beginning of its flow through any ammonia synthesis catalyst bed is about 700° to 800° F.

8. The process of claim 1, 2 or 3 wherein the temperature of the gas mixture at the end of its flow through any ammonia synthesis catalyst bed is about 750° to 1000° F.

9. The process of claim 1, 2 or 3 wherein the temperature of the feed syngas prior to step (a) is approximately 500° to 600° F.

10. The process of claim 1, 2 or 3 wherein the temperature of the final product effluent from (d) is about 600° to 750° F.

11. The process of claim 1, 2 or 3 wherein each of the heat exchange and steam generator units is optionally controlled by a bypass system.

12. The process of claim 11 wherein the bypass control system is an internal bypass control.

13. A method of improving yield in a process for the synthesis of ammonia carried out at a pressure greater than 100 atmospheres, which method comprises (a) at least three catalyst beds in series over which the ammonia feed syngas passes in continuous flow; (b) controlling the temperature of the feed syngas from the first catalyst bed by means of heat exchange with the feed syngas to the first catalyst bed; and (c) controlling the temperature of effluent from all subsequent catalyst beds in series by means of a high pressure steam generator in series with the effluent of each.

14. The method of claim 13 wherein the temperature of the feed syngas to each catalyst bed is between 700° to 800° F.

15. The method of claim 14 wherein the effluent from the high pressure steam generator in series with the last catalyst bed in series is heat exchanged with fresh feed syngas.

16. The method of claim 13 wherein the heat exchange for the effluent from the first catalyst bed and each high pressure steam generator is optionally provided with a bypass control.

17. The method of claim 16 wherein the bypass control is effected by an internal bypass valve.

18. The process of claim 13 wherein the number of catalyst beds in series is three.

19. A process for synthesizing ammonia from nitrogen and hydrogen carried out at a pressure greater than 100 atmospheres which process comprises (a) passing a mixture of hydrogen and nitrogen in continuous flow through a series of three catalyst beds; (b) heating at least a portion of the feed syngas prior to its entrance into the first catalyst bed by heat exchange with at least a portion of a final product effluent from the third catalyst bed in the series and with at least a portion of the effluent from the first catalyst bed in the series; and (c) cooling the effluent from each of the second and third catalyst beds in the series by means of a high pressure steam generator in series with the effluent from each of the second and third catalyst beds.

20. The method of claim 19 wherein the temperature of the flowing gas mixture at the entrance to each catalyst bed is between 700° and 800° F.

21. The method of claim 20 wherein the effluent from the first catalyst bed is between 900° and 1000° F.; the effluent from the second catalyst bed is between 850° and 950° F., and the temperature of the effluent from the third catalyst bed is between 800° and 900° F.

22. The method of claim 20 wherein the heat exchange for the effluent from the first catalyst bed and each high pressure steam generator is optionally provided with a bypass valve control.

23. The method of claim 22 wherein the bypass control effected by an internal bypass valve.

24. A process for the synthesis of ammonia carried out at a pressure greater than 100 atmospheres which process comprises:
   (a) passing at least a portion of an ammonia feed syngas through a heat exchanger to increase its temperature to approximately 500° to 600° F.;
   (b) passing a first portion of the ammonia feed syngas from (a) into a second heat exchanger to further increase its temperature;

(c) combining the first portion of the ammonia feed syngas from (b) with a second portion of the ammonia feed syngas from (a) to form a combined feed syngas having a temperature of approximately 700° to 800° F., the flow of the second portion being adjusted so as to maintain the temperature of the combined feed syngas between approximately 700° to 800° F.;

(d) passing the combined feed syngas from (c) through a first ammonia synthesis catalyst bed to obtain an effluent with a temperature between approximately 900° to 1000° F.;

(e) passing the effluent from (d) through the heat exchanger of (b) thus decreasing its temperature to approximately 700° to 800° F.;

(f) passing the effluent from (e) through an additional ammonia synthesis catalyst bed, and then through a high pressure steam generator to produce an effluent whose temperature is 700° to 800° F.;

(g) passing the effluent from (f) through still another ammonia synthesis catalyst bed and then through still another high pressure steam generator to obtain an effluent whose temperature is 700° to 800° F.; and (h) passing the effluent from (g) through the heat exchanger of (a) to obtain an effluent which contains an ammonia content corresponding to at least a 20% conversion.

25. The process of claim 24 wherein each of the heat exchange and steam generation units is optionally controlled by a bypass system.

26. The process of claim 25 wherein the bypass control system is an internal bypass control.

* * * * *